US012370387B2

(12) United States Patent
McKeeman

(10) Patent No.: US 12,370,387 B2
(45) Date of Patent: Jul. 29, 2025

(54) PORTABLE AND COMPACT HYPERBARIC CHAMBER

(71) Applicant: Bruce Elgin McKeeman, Mound, MN (US)

(72) Inventor: Bruce Elgin McKeeman, Mound, MN (US)

( * ) Notice: Subject to any disclaimer, the term of this patent is extended or adjusted under 35 U.S.C. 154(b) by 748 days.

(21) Appl. No.: 17/579,398

(22) Filed: Jan. 19, 2022

(65) Prior Publication Data

US 2023/0226387 A1 Jul. 20, 2023

(51) Int. Cl.
*A62B 31/00* (2006.01)
*A61G 10/02* (2006.01)

(52) U.S. Cl.
CPC ............ *A62B 31/00* (2013.01); *A61G 10/026* (2013.01); *A61G 2220/00* (2013.01)

(58) Field of Classification Search
CPC ..... A61M 31/002; A61M 35/30; A61H 33/14; A62B 31/00; A61G 10/023; A61G 10/026
USPC .................. 128/202.13, 205.26–27; 119/420
See application file for complete search history.

(56) References Cited

U.S. PATENT DOCUMENTS 4,485,806 A * 12/1984 Akers .................. A62B 17/001 600/21
4,974,829 A * 12/1990 Gamow ............... A61G 10/026 52/2.17
5,255,673 A * 10/1993 Cardwell .............. B63C 11/325 405/185
5,678,543 A * 10/1997 Bower ................... A62B 31/00 128/205.26
6,062,215 A * 5/2000 Leininger ............ A61G 10/026 5/713
7,958,904 B2 * 6/2011 Lau ......................... E04H 15/48 135/147
2004/0154616 A1 * 8/2004 Parker Risley ...... A61G 10/026 128/202.12
2008/0210239 A1 * 9/2008 Lewis .................... A62B 31/00 128/205.26
2011/0226252 A1 * 9/2011 Milne .................. A61G 10/023 128/205.26
2014/0366881 A1 * 12/2014 McKeeman ......... A61G 10/026 128/205.24
2022/0096303 A1 * 3/2022 Kokalj ................... A62B 31/00

* cited by examiner

*Primary Examiner* — Colin W Stuart
*Assistant Examiner* — Matthew D Ziegler

(57) ABSTRACT

A portable and compact hyperbaric chamber includes an inflatable chamber, a weighted base, a dump valve, at least one auxiliary port, an external pressure gage, a plurality of fill valves, and a plurality of pressure relief valves. The access opening is integrated into a lateral panel of the inflatable chamber and provide in and out access to the inflatable chamber. The weighted base is mounted to the base panel and functions as a stable base. The plurality of fill valves is in fluid communication with the inflatable chamber to provide compressed air from a compressor so that the inflatable chamber can be pressurized. The plurality of pressure relief valves is in fluid communication with the inflatable chamber to maintain a specific pressure within the inflatable chamber. The dump valve, the auxiliary port, and the external pressure gage are in fluid communication with the inflatable chamber to optimize the functionality.

12 Claims, 11 Drawing Sheets

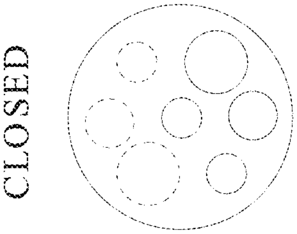
FIG. 11-A
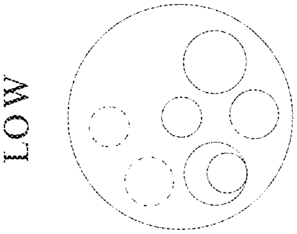
FIG. 11-B
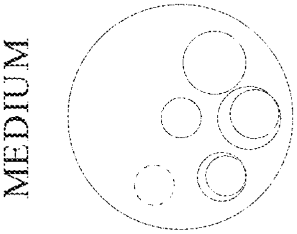
FIG. 11-C
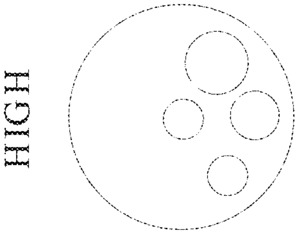
FIG. 11-D
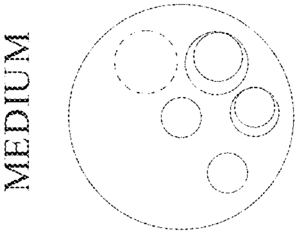
FIG. 11-E
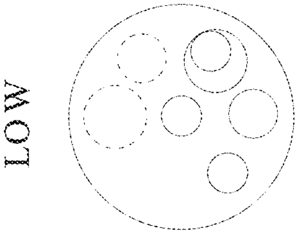
FIG. 11-F

PORTABLE AND COMPACT HYPERBARIC CHAMBER

FIELD OF THE INVENTION

The present invention relates generally to hyperbaric chamber devices. More specifically, the present invention is a portable and compact hyperbaric chamber with a side access opening. The compact and portable configuration ease transportation and storage of the present invention.

BACKGROUND OF THE INVENTION

In present society, there has been an increase in the personalized usage of hyperbaric chamber devices. Currently, more users are investing in hyperbaric chamber devices. Most hyperbaric chamber devices utilize a longitudinal zipper fastener along a side wall of the hyperbaric chamber device so that the users can enter or exit the hyperbaric chamber device. However, with these hyperbaric chamber devices, it can be difficult for some users to easily transport the hyperbaric chamber device due to their size and configuration.

It is an objective of the present invention is to provide users a portable hyperbaric chamber device with a side access opening. The present invention intends to provide users with a device that can make it easier for any user or users to transport from one location to another. The present invention can be easily assembled or disassembled by an individual. Once the present invention is disassembled, the present invention can be stored within a standard traveling luggage or any other types of bag/box for easily transport or easy storage. Furthermore, a single user can easily assemble the present invention prior to usage without requiring any professional skills.

BRIEF DESCRIPTION OF THE DRAWINGS

FIG. 11-A is a basic inside view of the dump valve which shows the plurality of stationary holes and the plurality of rotary holes are completely sealed from one another, wherein the dump valve is completely sealed.

FIG. 11-B is a basic inside view of the dump valve which shows the plurality of stationary holes and the plurality of rotary holes are partially sealed from one another, wherein the dump valve allows a small amount of air to escape.

FIG. 11-C is a basic inside view of the dump valve which shows the plurality of stationary holes and the plurality of rotary holes are partially sealed from one another, wherein the dump valve allows a large amount of air to escape.

FIG. 11-D is a basic inside view of the dump valve which shows the plurality of stationary holes and the plurality of rotary holes are completely aligned with one another, wherein the dump is working at its full capacity.

FIG. 11-E is a basic inside view of the dump valve which shows the plurality of stationary holes and the plurality of rotary holes are partially sealed from one another, wherein the dump valve allows a large amount of air to escape.

FIG. 11-F is a basic inside view of the dump valve which shows the plurality of stationary holes and the plurality of rotary holes are partially sealed from one another, wherein the dump valve allows a small amount of air to escape.

DETAIL DESCRIPTIONS OF THE INVENTION

All illustrations of the drawings are for the purpose of describing selected versions of the present invention and are not intended to limit the scope of the present invention.

Figure 1:
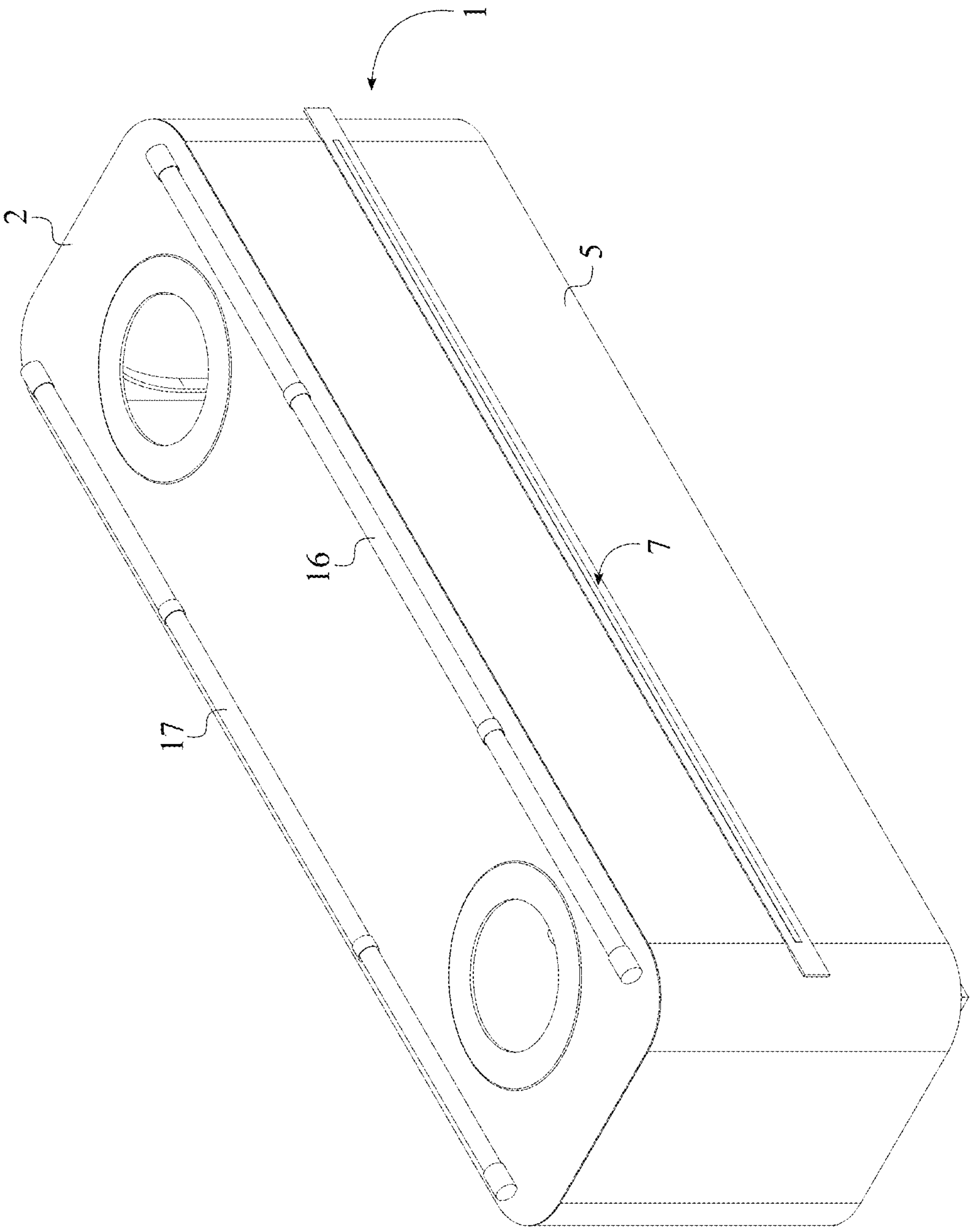
FIG. 1 is a front-top perspective view of the present invention.
Figure 2:
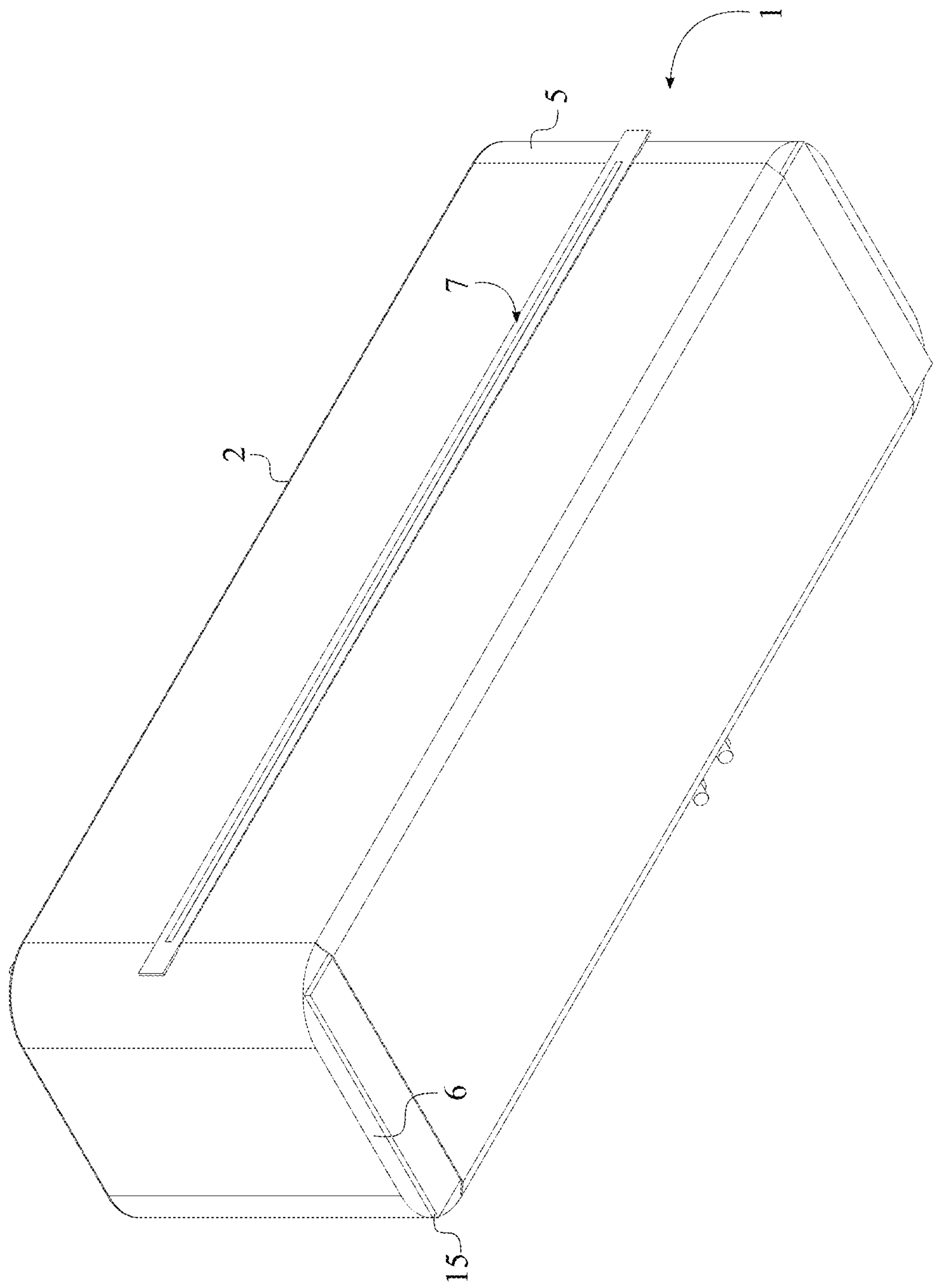
FIG. 2 is a bottom perspective view of the present invention.
Figure 3:
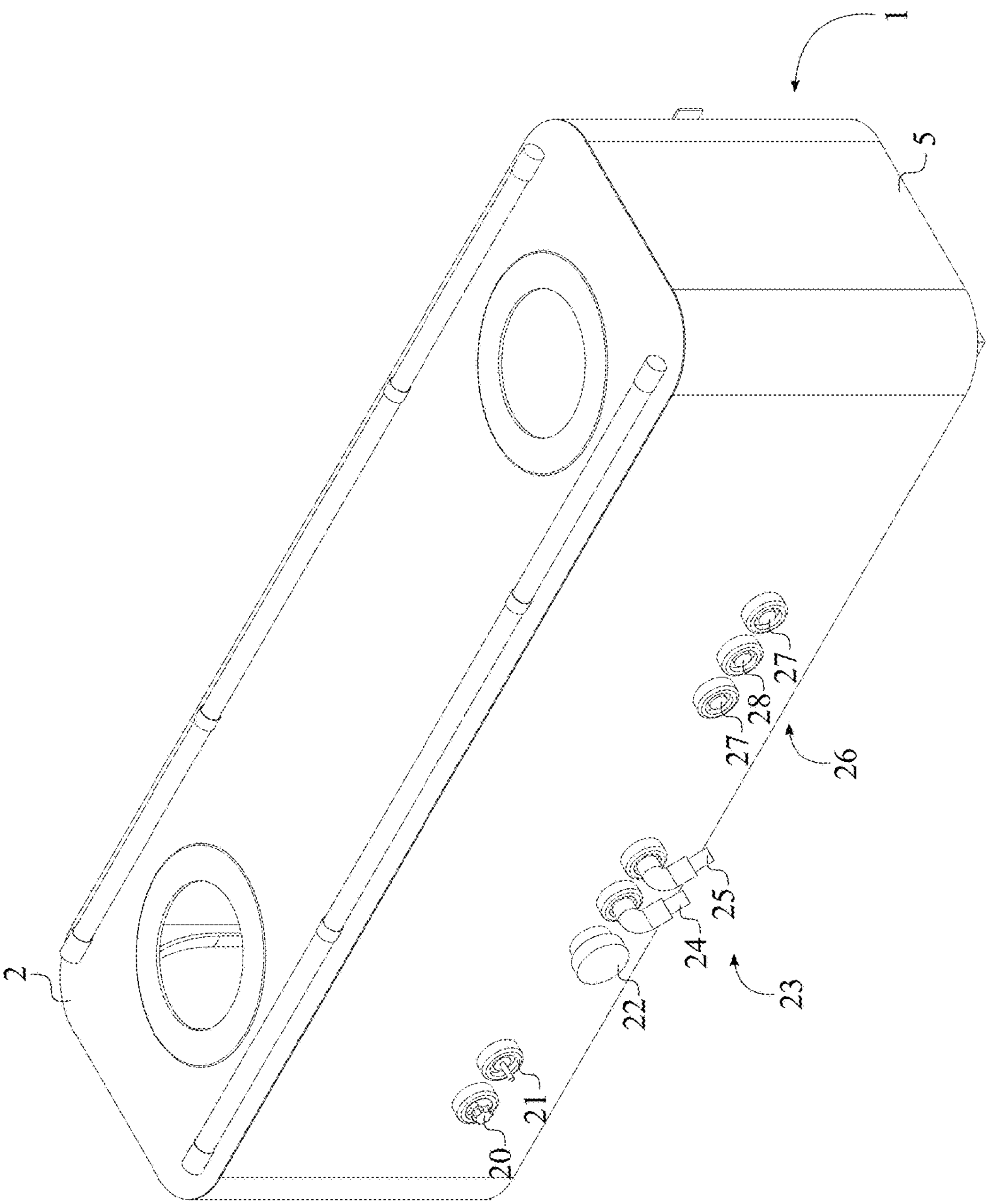
FIG. 3 is a rear-top perspective view of the present invention.

The present invention is a portable and compact hyperbaric chamber device. The present invention can be of any shape, size, material, features, type or kind, orientation, location, quantity, components, and arrangements of components that would allow the present invention to fulfill the objectives and intents of the present invention. As shown in FIG. 1-3, the present invention comprises an inflatable chamber 1, a weighted base 15, a dump valve 20, at least one auxiliary port 21, a pressure gage 22, a plurality of fill valves 23, and a plurality of pressure relief valves 26.

In reference to the general configuration of the present invention, the inflatable chamber 1 that functions as a pressured vessel to accommodate a user comprises a top panel 2, a lateral panel 5, a base panel 6, and an access opening 7 as shown in FIG. 1-3. The top panel 2 and the base panel 6 are oppositely positioned of each other about the lateral panel 5, wherein the top panel 2 and the base panel 6 delineate the length of the present invention. The top panel 2 is perimetrically connected to the lateral panel 5. The base panel 6 is perimetrically connected to the lateral panel 5. Due to the configuration of the top panel 2, the lateral panel 5, and the base panel 6, the inflatable chamber 1 is formed into an elongated cylindrical shape. The access opening 7 is integrated into the lateral panel 5 so that the user can enter or exits the inflatable chamber 1 via the access opening 7. Furthermore, the access opening 7 can be opened or closed from the inside or the outside of the inflatable chamber 1. The connections between the top panel 2, the lateral panel 5, and the base panel 6 are preferably completed with the radio frequency (RF) welding so that the present invention can maintain high strength connection points for additional durability. The weighted base 15 is mounted to the base panel 6 so that the inflatable chamber 1 can maintain a stationary position. The dump valve 20, which can deflate the inflatable chamber 1, is in fluid communication with the inflatable chamber 1. The auxiliary port 21*s* is in fluid communication with the inflatable chamber 1 so that optional medical equipment such as oxygen suppling systems or gas sampling systems can be operatively coupled to the present invention. The pressure gage 22 is in fluid communication with the inflatable chamber 1 to continuously display the inside pressure of the inflatable chamber 1. The plurality of fill valves 23 is in fluid communication with the inflatable chamber 1 so that the inflatable chamber 1 can be pressurized with an operation of at least one compressor. The plurality of pressure relief valves 26 is in fluid communication with the inflatable chamber 1 in order to maintain a safe pressurized environment for the user of the present invention.

In reference to FIG. 1, the inflatable chamber 1 is preferably an elongated cylindrical-like shaped object. It is preferred that a wall thickness of the top panel 2, the lateral panel 5, and the base panel 6 is sufficient to support a full-grown adult-sized user. It is preferred that the inflatable chamber 1 is made of material that has the following characteristic; lightweight, strong, flexible, leak-proof, non-breathable, tough, tear-resistant, non-penetrable, non-rupturing, and easily manufacturable.

Figure 4:
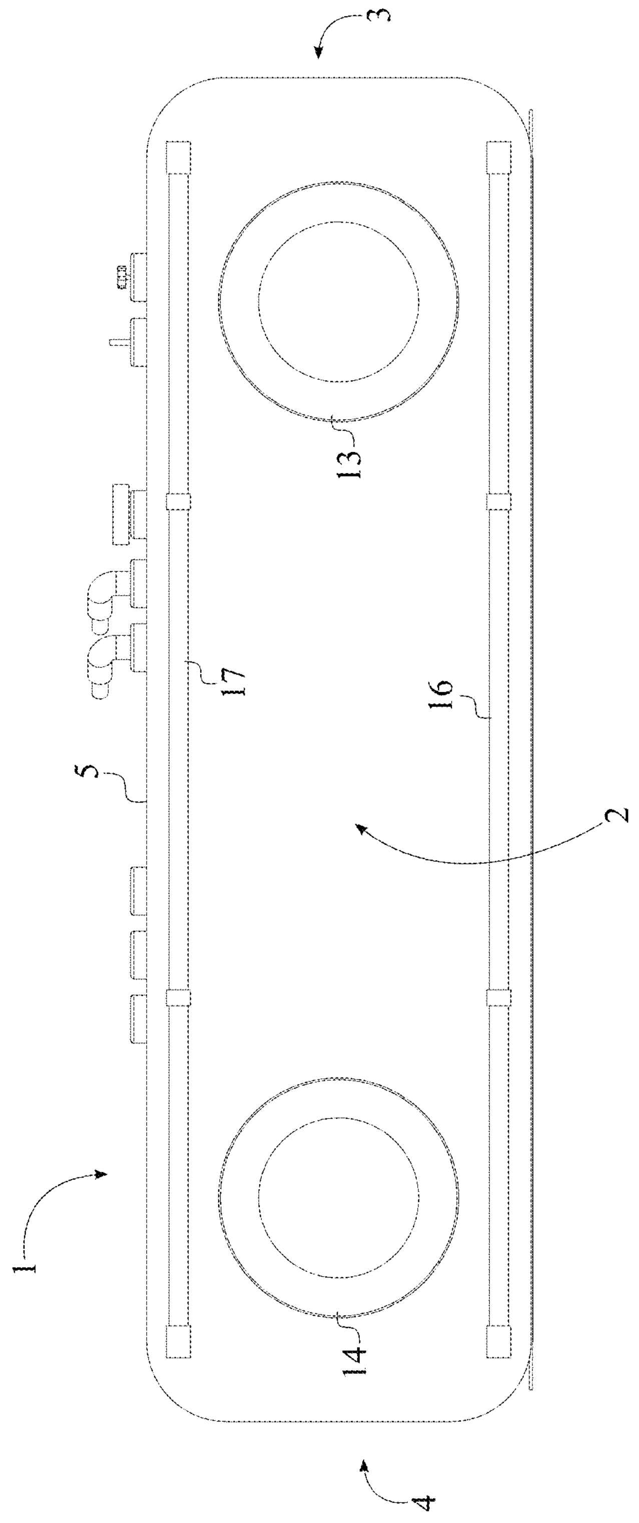
FIG. 4 is a top view of the present invention.

In reference to FIG. 4, the present invention further comprises a first transparent window 13 and a second transparent window 14. Preferably, the first transparent window 13 and the second transparent window 14 are located towards the terminal ends of the inflatable chamber 1 so that the user can easily view the outside of the inflatable chamber 1 while laying down. The first transparent window 13 is hermetically connected to the top panel 2 and positioned adjacent to a first end 3 of the top panel 2. As a result, the user can view the outside of the inflatable chamber 1 through the first transparent window 13 when the user's head is positioned below the first end 3 of the top panel 2. The second transparent window 14 is hermetically connected to the top panel 2 and positioned adjacent to a second end 4 of the top panel 2. As a result, the user can view the outside of the inflatable chamber 1 through the second transparent window 14 when the user's head is positioned below the second end 4 of the top panel 2. Furthermore, the first transparent window 13 and the second transparent window 14 allow light to transmit into the inflatable chamber 1.

The present invention can further comprise a floor mat. More specifically, the floor mat is positioned within the inflatable chamber 1 and adjacently positioned over the base panel 6. The floor mat is preferably extended along the base panel 6 so that the floor mat is able to completely cover the base panel 6. It is preferred that the floor mat is made from a thick, supportive, and/or comfortable material to comfort the laydown position of the user. Since the floor mat is not permanently fixed to the base panel 6, users can easily remove and insert the floor mat through the access opening 7 without compromising the structural integrity of the present invention.

In reference to FIG. 1 and FIG. 4, the present invention further comprises a first elongated support 16 and a second elongated support 17 that is made of materials that are lightweight, tough, durable, strong, load-bearing, and/or easily manufacturable. The first elongated support 16 and the second elongated support 17 are positioned parallel to each other and opposite from the base panel 6. The first elongated support 16 and the second elongated support 17 are extended along the top panel 2 so that the inflatable chamber 1 can be move around via the first elongated support 16 and the second elongated support 17. In other words, the first elongated support 16 is attached to the top panel 2. The second elongated support 17 is attached to the top panel 2. As a result, the user can grasp the first elongated support 16 and the second elongated support 17 to easily move the inflatable chamber 1 from one location to another when the inflatable chamber 1 is pressured. Furthermore, the first elongated support 16 and the second elongated support 17 each comprises a plurality of modular bodies that inlock with one another. When the present invention need to be stored away or transported, the user can easily disassemble the first elongated support 16 and the second elongated support 17 into the plurality of modular bodies. When the present invention needs to be operational, the user can easily assemble the plurality of modular bodies into the first elongated support 16 and the second elongated support 17.

In reference to FIG. 5-8, the present invention further comprises a first vertical frame 18 and a second vertical frame 19 that is made of materials that are lightweight, tough, flexible, durable, strong, load-bearing, and/or easily manufacturable. The first vertical frame 18 is positioned within the inflatable chamber 1 and formed into a flexible D-shaped body. The second vertical frame 19 is positioned within the inflatable chamber 1 formed into a flexible D-shaped body. The first vertical frame 18 and the second vertical frame 19 are oppositely positioned of each other along the base panel 6 to provide structural support for the lateral panel 5. More specifically, the first vertical frame 18 is attached to a first end 3 of base panel 6 so that the first vertical frame 18 is able to structurally support the lateral panel 5 in between the first end 3 of the base panel 6 and the first end 3 of the top panel 2 when the inflatable chamber 1 is pressurized. The second vertical frame 19 is attached to a second end 4 of base panel 6 so that the second vertical frame 19 is able to structurally support the lateral panel 5 in between the second end 4 of the base panel 6 and the second end 4 of the top panel 2 when the inflatable chamber 1 is pressurized. Both the first vertical frame 18 and the second vertical frame 19 are preferably attached to the base panel 6 via hook-and-loop fastening mechanism; however, the present invention can utilize any other types of quick release fastening mechanism other than the hook-and-loop fastening mechanism. As a result, when the present invention is stored away, the user can easily remove the first vertical frame 18 and the second vertical frame 19 from the inflatable chamber 1 thus maximizing the storage space.

Figure 9:
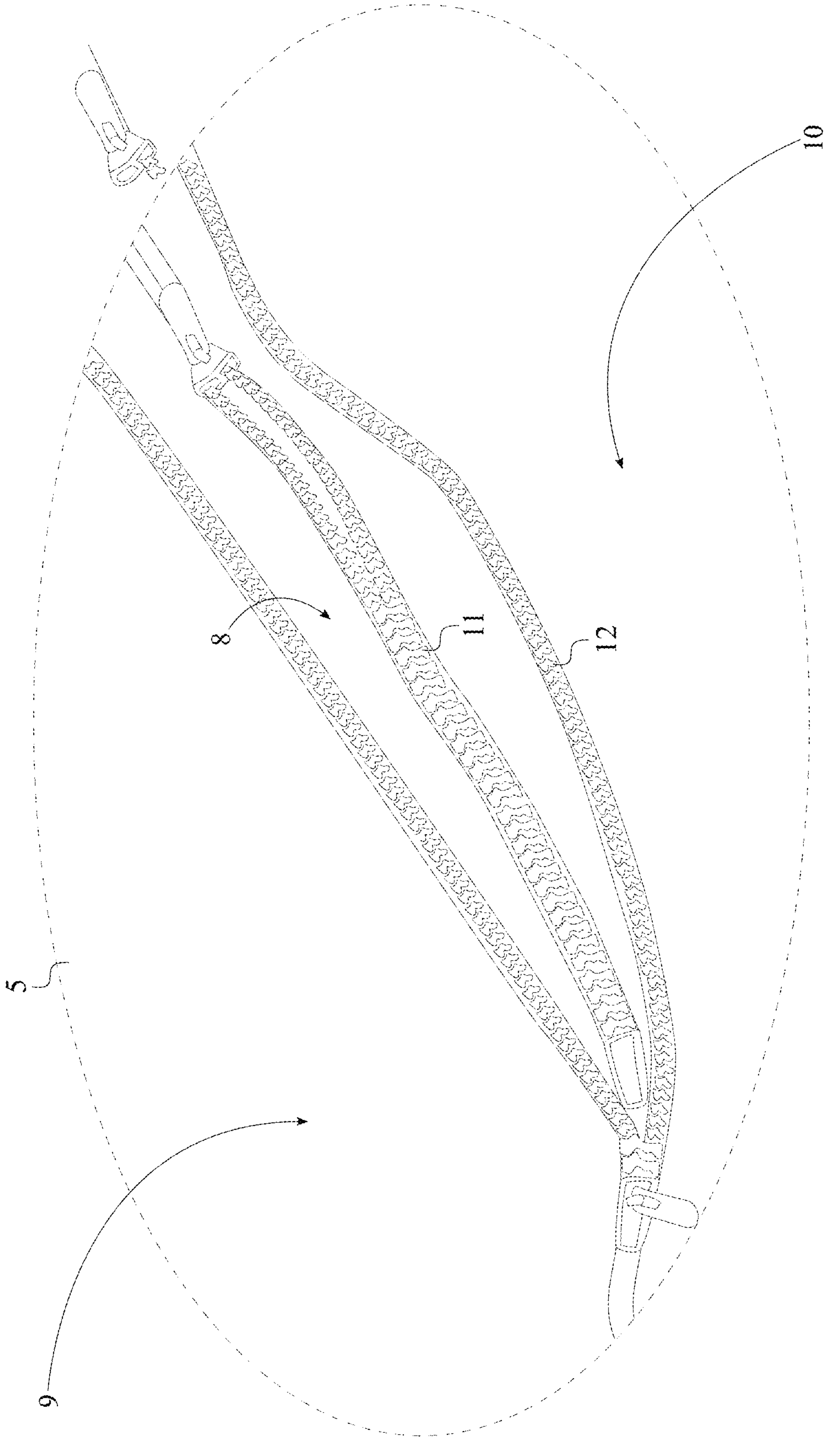
FIG. 9 is a detailed view showing the positioning of the exterior zipper and the interior zipper of the present invention.

In reference to FIG. 2 and FIG. 9, the access opening 7 is linearly extended along the base panel 6. In other words, the access opening 7 is linearly positioned on the lateral panel 5 and in between the first end 3 and the second end 4 of the base panel 6. The access opening 7 comprises a slit 8, an interior zipper 11, and an exterior zipper 12. The access opening 7 provides an opening so that the user can move in and out of the inflatable chamber 1. More specifically, the slit 8 that provides the opening comprises a first portion 9 and a second portion 10, where the first portion 9 and the second portion 10 are oppositely positioned from each other. The first portion 9 and the second portion 10 of the slit 8 are hermetically attached to each other through the interior zipper 11 so that the pressurized air can be withheld within the inflatable chamber 1. The first portion 9 and the second portion 10 of the slit 8 are structurally attached to each other through the exterior zipper 12 so that the present invention is able to maintain the structural integrity around the access opening 7. The exterior zipper 12 is adjacently positioned within the first portion 9 and the second portion 10, and the interior zipper 11 is adjacently positioned with the outside zipper in such way that the interior zipper 11 is positioned within the lateral panel 5. For safety purposes, the interior zipper 11 and the exterior zipper 12 can be opened or closed from inside of the inflatable chamber 1 or the outside of the inflatable chamber 1.

Figure 5:
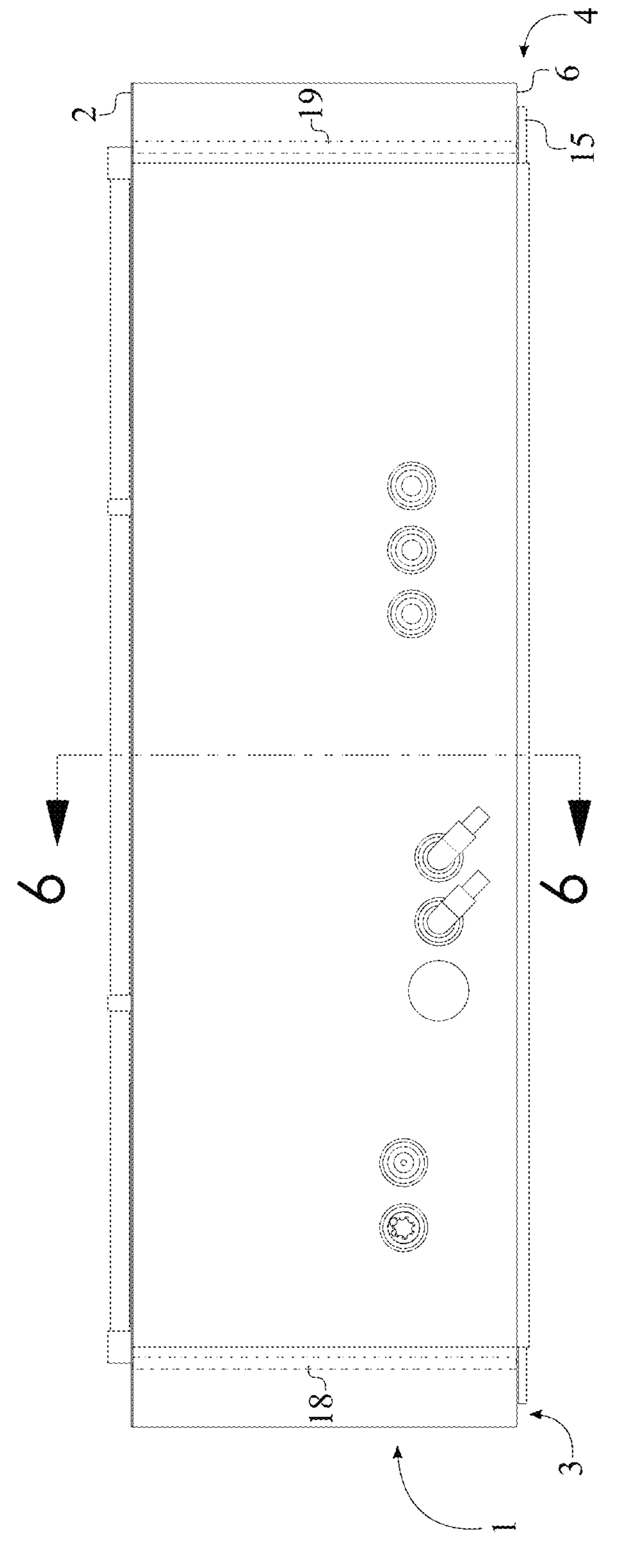
FIG. 5 is a rear view of the present invention, showing the plane upon which a cross sectional view is taken shown in FIG. 6.
Figure 6:
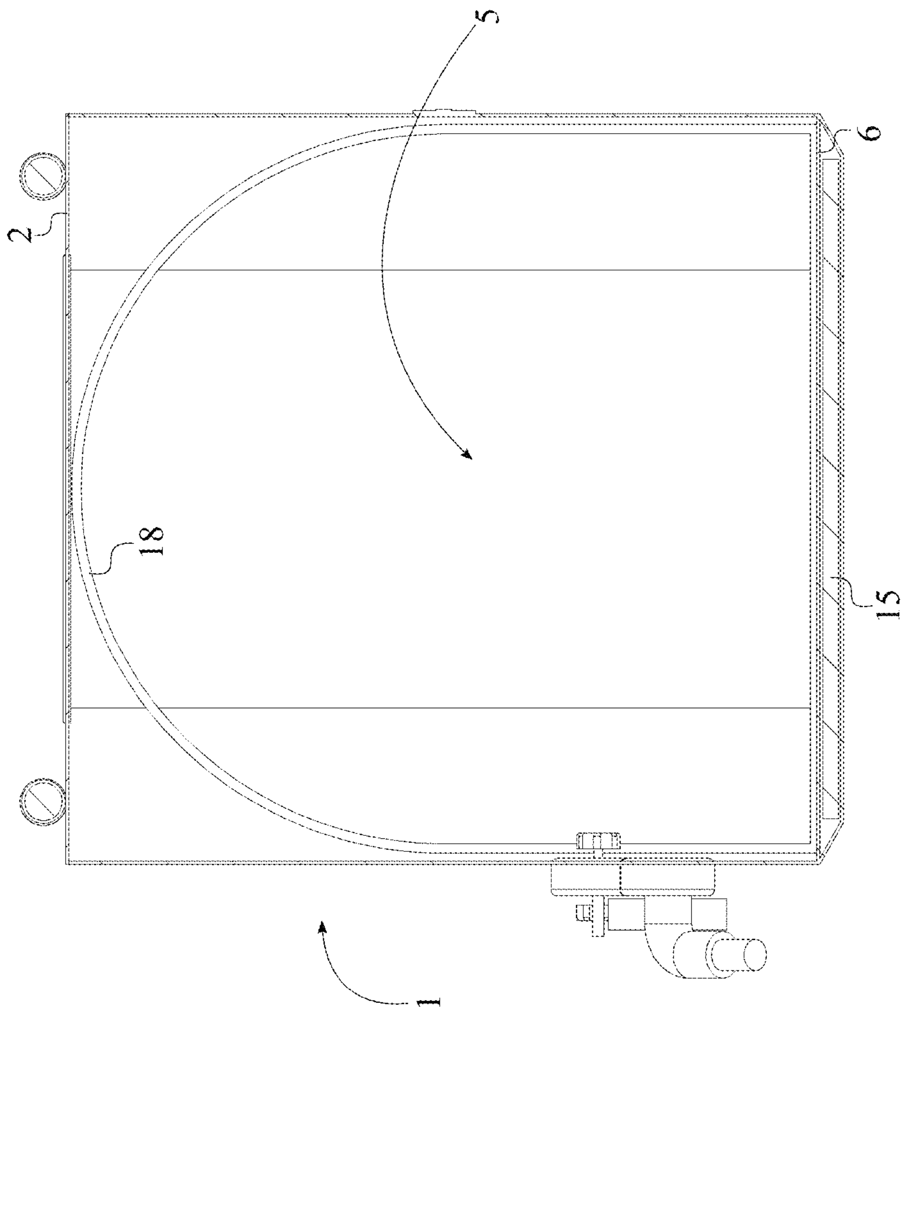
FIG. 6 is a cross section view of the present invention taken along line 6-6 of FIG. 5, showing the inner positioning of the first vertical frame.
Figure 7:
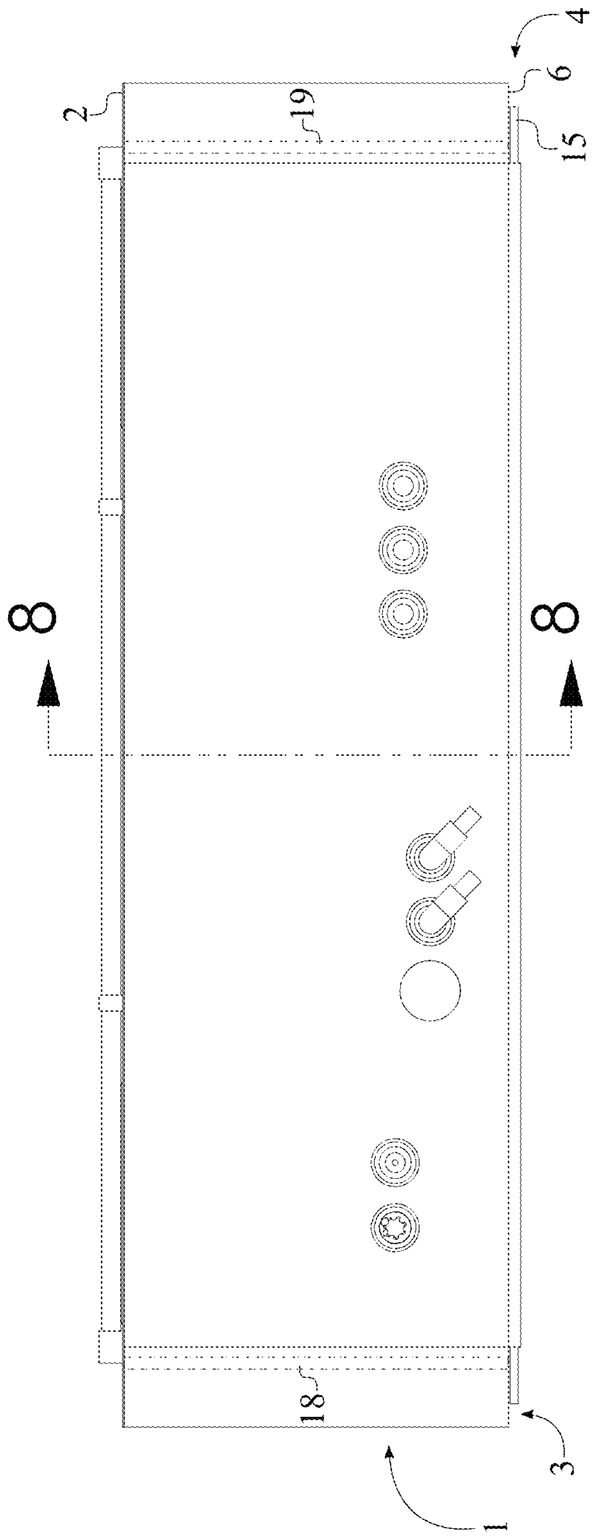
FIG. 7 is a rear view of the present invention, showing the plane upon which a cross sectional view is taken shown in FIG. 8.
Figure 8:
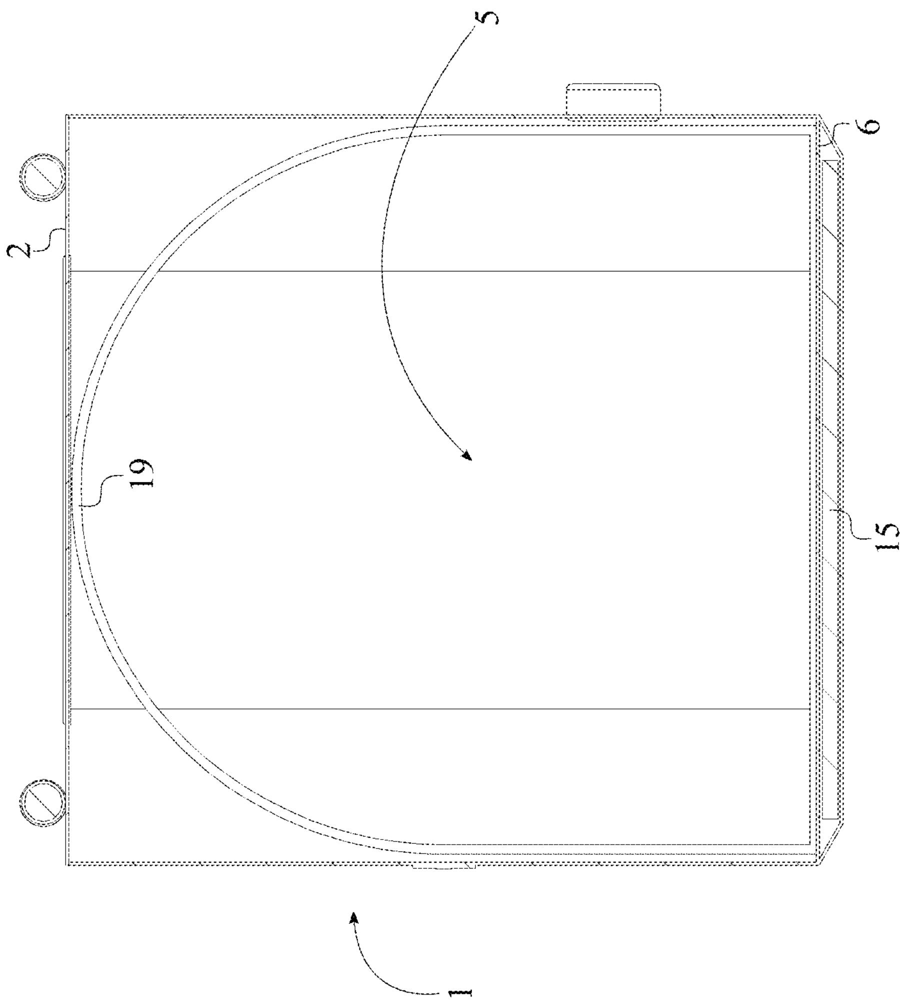
FIG. 8 is a cross section view of the present invention taken along line 8-8 of FIG. 7, showing the inner positioning of the second vertical frame.

In reference to FIG. 5, the weighted base 15 is externally mounted to the base panel 6 so that the inflatable chamber 1 does not roll over during operation. Furthermore, the weighted base 15 can be folded into a compact form to save space during storage and transportation. Furthermore, the weighted base 15 also provides a comfortable surface area for the user to lay down during usage of the present invention.

Figure 10:
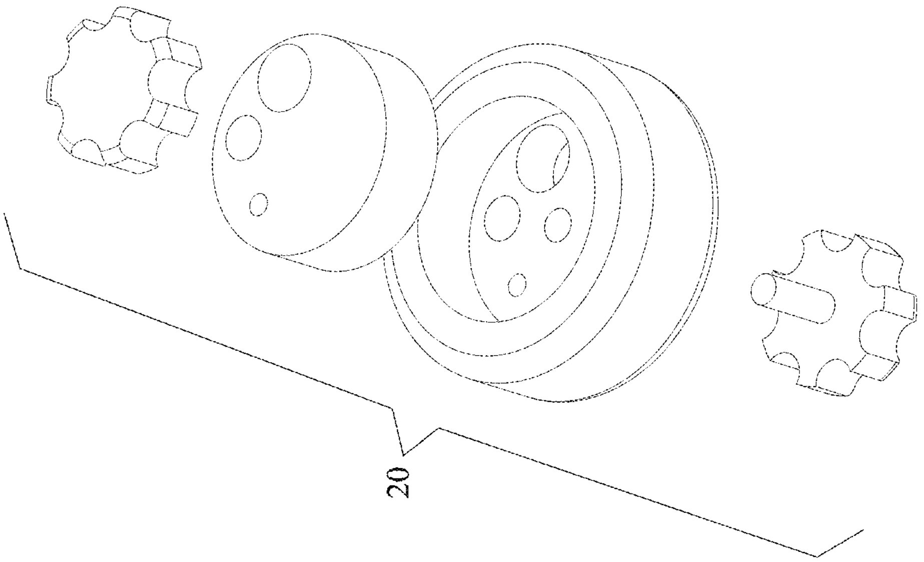
FIG. 10 is a preferred exploded embodiment for the dump valve of the present invention.

In reference to FIG. 3, the dump valve 20 is connected to the lateral panel 5 and traverses through the lateral panel 5 so that the inflatable chamber 1 can be quickly deflated. More specifically, the dump valve 20 allows the user or the care giver to manually control the inside pressure of the inflatable chamber 1 or to deflate the inflatable chamber 1. A preferred embodiment of the dump valve 20 comprises a stationary plate, a plurality of stationary holes, a rotary plate, a plurality of rotary holes, an outside knob, and an inside knob as shown in FIG. 10. The stationary plate is connected to the lateral panel 5, and the plurality of stationary holes is radially positioned on the stationary plate. Each of the plurality of stationary holes has a different diameter, where each of the plurality of stationary holes differs from one another. The rotary plate is rotatably connected with the stationary plate, where the rotary plate is adjacently positioned with the stationary plate from outside of the lateral panel 5. The plurality of rotary holes is radially positioned on the rotary plate. Each of the plurality of rotary holes has a different diameter, where each of the plurality of rotary holes differs from one another. Since each of the plurality of stationary holes and each of the plurality of rotary holes have different diameters, The plurality of stationary holes and the plurality of rotary holes are positioned in the order of increasing size, such that a small hole is adjacent to a medium hole, the medium hole is in between the small hole and a large hole, and the large hole is adjacent to the medium hole. The outside knob is concentrically connected with the rotary plate and allows the care giver standing outside of the inflatable chamber 1 to manually control inside pressure. The inside knob is concentrically traversed through the stationary plate and connected with the rotary plate in such way that the inside knob is oppositely positioned from the outside knob. The inside knob allows the user within the inflatable chamber 1 to manually control the inside pressure without exiting the inflatable chamber 1.

In reference to a preferred operation of the dump valve 20, the dump valve 20 is operated by turning the outside knob or the inside knob which turns the rotary plate, changing the alignment of the plurality of rotary holes with respect to the plurality of stationary holes. As shown in FIG. 11-A, when none of the plurality of rotary holes is aligned with the plurality of stationary holes, the dump valve 20 is completely sealed and the pressure inside the inflatable remains constant. As shown in FIG. 11-D, when all of the plurality of rotary holes is aligned with the plurality of stationary holes, the dump valve 20 is working at its full capacity. In reference to FIGS. 11-B, 11-C, 11-E, and 11-F, by only aligning some of the plurality of rotary holes with the plurality of stationary holes, the dump valve 20 can be used to adjust the rate of depressurization. In reference to FIG. 11-F, the first example that aligns some of the plurality of rotary holes with the plurality of stationary holes shows that the large hole of the plurality of stationary holes is aligned with the small hole of the plurality of rotary holes, letting out a small amount of air, since the small hole of the plurality of rotary holes bottlenecks the large hole of the plurality of stationary holes. In reference to FIG. 11-E, the second example that aligns some of the plurality of rotary holes with the plurality of stationary holes shows that the large hole and the medium hole of the plurality of stationary holes are aligned with the medium hole and the small hole of the plurality of rotary holes, which would release a larger amount of air. These two sample configurations allow some depressurization to occur, but not as much when compared to having all of the plurality of rotary holes align with the plurality of stationary holes.

In reference to FIG. 3, the auxiliary port 21 is connected to the lateral panel 5 in such way that the auxiliary port 21 traverses through the lateral panel 5. The auxiliary port 21 is in fluid communication with the inflatable chamber 1 so that optional medical equipment such as oxygen suppling system or gas sampling system can be operatively coupled with the present invention.

In reference to FIG. 3, the pressure gage 22 is externally connected to the lateral panel 5 so that an inside pressure of the inflatable chamber 1 can be displayed through the pressure gage 22. In order to accurately measure the inside pressure of the inflatable chamber 1, the pressure gage 22 traverses through the lateral panel 5. The pressure gauge can be a mechanical pressure gauge or an electronic pressure gauge as the inside pressure of the inflatable chamber 1 is continuously measured and displayed through a display screen of the external pressure gauge. Furthermore, the display screen is preferably color-coded for simplified reading while the numerical pressure value is displayed with accuracy of a plus or minus five percent. For example, a first color of the display screen along with the numerical values indicates that the inside pressure is below the operating pressure of the inflatable chamber 1. A second color of the display screen along with the numerical values indicates that the inside pressure is at the operating pressure of the inflatable chamber 1. A third color of the display screen along with the numerical values indicates that the inflatable chamber 1 is above the operating pressure. Due to the different colors and their respective numerical values, a caregiver or an operator of the present invention can easily monitor the inside operating pressure of the inflatable chamber 1 while being outside of the inflatable chamber 1.

In reference to FIG. 3, the plurality of fill valves 23 comprises a first fill valve 24 and a second fill valve 25 so that the inflatable chamber 1 can be pressurized through one or more compressors. In other words, at least one compressor is in fluid communication with the plurality of fill valves 23 through medical grade quick-connect fittings and tubes so that compressed air can be pumped into the inflatable chamber 1. More specifically, the first fill valve 24 is connected to the lateral panel 5 and traverses through the lateral panel 5. The second fill valve 25 is connected to the lateral panel 5; and traverses through the lateral panel 5. Preferably, the first fill valve 24 is in fluid communication with a first compressor of the at least one compressor while the second fill valve 25 is in fluid communication with a second compressor of the at least one compressor. Individual and dual compressor connection to the plurality of fill valves 23 further enhances the efficiency of the present invention even though a single compressor is sufficient enough to operate the present invention. The at least one compressor must maintain an on-position for the entire treatment period to ensure the proper air circulation and exchange so that a safe and comfortable treatment environment can be obtained for the user. Optionally, each of the plurality of fill valves 23 comprises a built-in muffler to reduce the noise of air entering into the inflatable chamber 1 and a removable air filter to purify the air entering into the inflatable chamber 1.

In reference to FIG. 3, the plurality of pressure relief valves 26 comprises at least one first relief valve 27 and at least one second relief valve 28. The first relief valve 27 is connected to the lateral panel 5 and traverses through the lateral panel 5. The second relief valve 28 is connected to the lateral panel 5 and traverses through the lateral panel 5. The first relief valve 27 and the second relief valve 28 are activated at two different pressures optimize the safety of the inflatable chamber 1. More specifically, the first relief valve 27 is activated at a lower pressure of the inflatable chamber 1 so that the present invention can maintain an operating pressure within the inflatable chamber 1. The first relief valve 27 automatically opens once the inflatable chamber 1 is fully pressurized up to the operating pressure, wherein the lower pressure is equal to the operating pressure. Preferably, the lower pressure of the inflatable chamber 1 is at 4.4 psi to provide a comfortable and safe environment for the user. The second relief valve 28 is activated at a higher pressure of the inflatable chamber 1 so that the present invention can maintain a safe operating pressure within the inflatable chamber 1. The second relief valve 28 automatically opens when in the inside pressure of the inflatable chamber 1 continue to rise beyond the operating pressure, wherein the higher pressure is equal to the maximum safe operating pressure. Preferably, the higher pressure of the inflatable chamber 1 is at 4.6 psi to provide a safe environment for the user without compromising the integrity of the present invention. In other words, the second relief valve 28 functions as a failsafe valve in the event that the first relief valve 27 is not functional. Furthermore, the first relief valve 27 and the second relief valve 28 allow the circulation of fresh air within the inflatable chamber 1 and the expulsion of carbon-dioxide out of the inflatable chamber 1 while maintaining the constant operating pressure within the present invention. In other words, when the first relief valve 27 and the second relief valve 28 are opened, circulated air within the inflatable chamber 1 exits through the present invention and allow fresh air to enter into the inflatable chamber 1 through the plurality of fill valves 23.

Optionally, the present invention may comprise at least one spare port to attached accessory devices or to attached other operational devices such as gages, valves, inlets, and other industry standard apparatus. More specifically, the spare port is connected to the lateral panel 5 and traverses through the lateral panel 5.

Although the invention has been explained in relation to its preferred embodiment, it is to be understood that many other possible modifications and variations can be made without departing from the spirit and scope of the invention as hereinafter claimed.

What is claimed is:

1. A portable and compact hyperbaric chamber comprising:

an inflatable chamber;
a weighted base;
a dump valve;
at least one auxiliary port;
a pressure gage;
a plurality of fill valves;
a plurality of pressure relief valves;
a first elongated support;
a second elongated support;
a first vertical frame;
a second vertical frame;
the inflatable chamber comprising a top elongated flat panel, a lateral panel, a base elongated flat panel, and an access opening;
the top elongated flat panel and the base elongated flat panel being oppositely positioned of each other about the lateral panel;
the top elongated flat panel being perimetrically connected to the lateral panel;
the base elongated flat panel being perimetrically connected to the lateral panel;
the access opening being integrated into the lateral panel;
the weighted base being mounted to the base elongated flat panel;
the weighted base being configured to prevent the inflatable chamber from rolling over during operation;
the weighted base being foldable into a collapsible compact form;
the dump valve being in fluid communication with the inflatable chamber;
the auxiliary port being in fluid communication with the inflatable chamber;
the pressure gage being in fluid communication with the inflatable chamber;
the plurality of fill valves being in fluid communication with the inflatable chamber;
the plurality of pressure relief valves being in fluid communication with the inflatable chamber;
the top elongated flat panel, the base elongated flat panel, and the lateral panel being sized and shaped to fit a single user within the inflatable chamber as the user lies down along the base elongated flat panel;
a plumb direction being oriented normal to the top elongated flat panel and the base elongated flat panel;
the first elongated support and the second elongated support being positioned parallel to each other;
the first elongated support and the second elongated support being oppositely positioned from the base elongated flat panel;
the first elongated support and the second elongated support being extended along a lengthwise dimension of the top elongated flat panel;
the first elongated support being attached to the top elongated flat panel;
the second elongated support being attached to the top elongated flat panel;
the first elongated support and the second elongated support each being an interlocking series of modular pieces;
the first vertical frame being positioned within the inflatable chamber;
the second vertical frame being positioned within the inflatable chamber;
the first vertical frame and the second vertical frame being oppositely positioned of each other along the base elongated flat panel;
the first vertical frame being attached to a first end of the base elongated flat panel; and
the second vertical frame being attached to a second end of the base elongated flat panel.

2. The portable and compact hyperbaric chamber as claimed in claim 1 comprising:

a first transparent window;
a second transparent window;
the first transparent window being connected to the top elongated flat panel;
the first transparent window being positioned adjacent to a first end of the top elongated flat panel;
the second transparent window being connected to the top elongated flat panel; and
the second transparent window being positioned adjacent to a second end of the top elongated flat panel.

3. The portable and compact hyperbaric chamber as claimed in claim 1, wherein the access opening is linearly extended along the base elongated flat panel.

4. The portable and compact hyperbaric chamber as claimed in claim 1 comprising:

the access opening comprising a slit, an interior zipper, and an exterior zipper;

the slit being positioned on the lateral panel;

the slit comprises a first portion and a second portion;

the first portion and the second portion being oppositely positioned from each other;

the first portion and the second portion being hermetically attached to each other through the interior zipper;

the first portion and the second portion being structurally attached to each other through the exterior zipper;

the exterior zipper being adjacently positioned within the first portion and the second portion; and the interior zipper being positioned within the lateral wall.

5. The portable and compact hyperbaric chamber as claimed in claim 1, wherein the weighted base is externally mounted to the base elongated flat panel.

6. The portable and compact hyperbaric chamber as claimed in claim 1 comprising:

the dump valve being connected to the lateral panel; and the dump valve traversing through the lateral panel.

7. The portable and compact hyperbaric chamber as claimed in claim 1 comprising:

the auxiliary port being connected to the lateral panel; and the auxiliary port traversing through the lateral panel.

8. The portable and compact hyperbaric chamber as claimed in claim 1 comprising:

the pressure gage being externally connected to the lateral panel; and the pressure gage traversing through the lateral panel.

9. The portable and compact hyperbaric chamber as claimed in claim 1 comprising:

the plurality of fill valves comprising a first fill valve and a second fill valve;

the first fill valve being connected to the lateral panel;

the first fill valve traversing through the lateral panel;

the second fill valve being connected to the lateral panel; and the second fill valve traversing through the lateral panel.

10. The portable and compact hyperbaric chamber as claimed in claim 1 comprising:

the plurality of pressure relief valves comprising at least one first relief valve and at least one second relief valve;

the first relief valve being connected to the lateral panel;

the first relief valve traversing through the lateral panel;

the second relief valve being connected to the lateral panel;

the second relief valve traversing through the lateral panel;

the first relief valve being activated at a lower pressure of the inflatable chamber; and the second relief valve being activated at a higher pressure of the inflatable chamber.

11. The portable and compact hyperbaric chamber as claimed in claim 10, wherein the lower pressure the inflatable chamber is maintained at 4.4 psi.

12. The portable and compact hyperbaric chamber as claimed in claim 10, wherein the lower pressure the inflatable chamber is maintained at 4.6 psi.

* * * * *